(12) United States Patent
Tachibana et al.

(10) Patent No.: US 7,913,102 B2
(45) Date of Patent: Mar. 22, 2011

(54) VARIABLE FREQUENCY CLOCK OUTPUT CIRCUIT AND APPARATUS, MOTOR DRIVING APPARATUS, AND IMAGE FORMING APPARATUS

(75) Inventors: Yuta Tachibana, Toyokawa (JP); Katsunori Takahashi, Hino (JP); Toru Kasamatsu, Toyokawa (JP); Tomonobu Tamura, Toyokawa (JP); Norihiko Nakano, Hoi-gun (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 817 days.

(21) Appl. No.: 11/853,649

(22) Filed: Sep. 11, 2007

(65) Prior Publication Data

US 2008/0122514 A1 May 29, 2008

(30) Foreign Application Priority Data

Nov. 29, 2006 (JP) ................................. 2006-322644

(51) Int. Cl.
*G06F 1/00* (2006.01)
*G06F 1/04* (2006.01)

(52) U.S. Cl. .......................... 713/500; 713/400; 713/600
(58) Field of Classification Search .................. 713/400, 713/500, 600
See application file for complete search history.

(56) References Cited

U.S. PATENT DOCUMENTS

| 5,198,732 | A | * | 3/1993 | Morimoto | 318/116 |
| 5,375,429 | A | * | 12/1994 | Tokizaki et al. | 62/235.1 |
| 6,130,602 | A | * | 10/2000 | O'Toole et al. | 340/10.33 |
| 6,211,739 | B1 | * | 4/2001 | Synder et al. | 331/1 A |
| 6,384,647 | B1 | * | 5/2002 | Logue | 327/153 |
| 6,628,171 | B1 | * | 9/2003 | Chou et al. | 331/1 A |
| 6,771,133 | B2 | * | 8/2004 | Lautzenhiser | 331/17 |
| RE41,031 | E | * | 12/2009 | Majos | 713/500 |
| 7,741,928 | B1 | * | 6/2010 | Cousinard et al. | 332/127 |
| 2002/0091960 | A1 | * | 7/2002 | Chang | 713/501 |
| 2003/0042506 | A1 | * | 3/2003 | Kellgren et al. | 257/200 |
| 2006/0098714 | A1 | * | 5/2006 | Shin et al. | 375/130 |
| 2006/0119562 | A1 | * | 6/2006 | Ichikura | 345/98 |

FOREIGN PATENT DOCUMENTS

| JP | 8-340250 | 12/1996 |
| JP | 9-148896 A | 6/1997 |
| JP | 11-341888 | 12/1999 |
| JP | 3067212 | 12/1999 |
| JP | 2003-79193 | 3/2003 |
| JP | 2003-168972 | 6/2003 |

OTHER PUBLICATIONS

Japanese Office Action mailed on Nov. 18, 2008 directed towards counterpart application No. 2006-322644; 4 pages.

* cited by examiner

*Primary Examiner* — Mark Connolly
(74) *Attorney, Agent, or Firm* — Morrison & Foerster LLP

(57) ABSTRACT

A variable frequency clock output circuit, comprising: a target value register which stores a target value corresponding to an arbitrarily set target frequency; an increase/decrease value register which stores an arbitrarily set increase/decrease value; an adder-subtractor which has an input portion into which a current output value is inputted and outputs a calculation result obtained by adding/subtracting the increase/decrease value stored in the increase/decrease value register to/from the current output value inputted into the input portion based on an addition/subtraction instruction signal; a comparator which compares an output value of the adder-subtractor to the target value stored in the target value register, and outputs an addition/subtraction instruction signal to the adder-subtractor until the output value of the adder-subtractor and the target value coincide; and a clock generator which outputs a clock signal having a frequency proportional to the output value of the adder-subtractor.

18 Claims, 15 Drawing Sheets

Example in the case of raising the frequency in 100ms from 500Hz to 5,000Hz
(No braking points)

|  | Target Value T | Increase/decrease Value S | Forcible Rewrite | Output |
|---|---|---|---|---|
| Activation Value Setting | 2097 | dummy | ON(1) | OFF(1) |
| Final Target Value Setting | 20972 | 12370 | OFF(0) | ON(0) |

Example in the case of raising the frequency in three steps, in 100ms from 500Hz to 5,000Hz
(with two braking points)

|  | Target Value T | Increase/decrease Value S | Forcible Rewrite | Forcible Rewrite |
|---|---|---|---|---|
| Activation Value Setting | 2097 | dummy | ON(1) | OFF(1) |
| First Target Value Setting | 4194 | 5497 | OFF(0) | ON(0) |
| Second Target Value Setting | 18874 | 19241 | OFF(0) | ON(0) |
| Final Target Value Setting | 20972 | 5500 | OFF(0) | ON(0) |

Example in the case of falling the frequency in 100ms from 5,000Hz to 500Hz (No braking points)

| | Target Value T | Increase/decrease Value S | Forcible Rewrite | Output |
|---|---|---|---|---|
| Stop Value Setting | 2097 | 12370 | OFF(0) | ON(0) |
| Pulse Stop Setting | 2097 | dummy | OFF(0) | OFF(1) |

Example in the case of falling the frequency in 30ms from 5,000Hz to 4,000Hz then restoring in 50ms from 4,000Hz to 5,000Hz

|  | Target Value T | Increase/decrease Value S | Forcible Rewrite | Output |
|---|---|---|---|---|
| Deceleration Setting | 16777 | 9164 | OFF(0) | ON(0) |
| Restoration Setting | 20972 | 5498 | OFF(0) | ON(0) |

VARIABLE FREQUENCY CLOCK OUTPUT CIRCUIT AND APPARATUS, MOTOR DRIVING APPARATUS, AND IMAGE FORMING APPARATUS

This application claims priority under 35 U.S.C. §119 to Japanese Patent Application No. 2006-322644 filed on Nov. 29, 2006, the entire disclosure of which is incorporated herein by reference in its entirety.

BACKGROUND OF THE INVENTION

1. Field of the Invention

The present invention relates to, for example, a variable frequency clock output circuit and apparatus preferably used to accelerate/decelerate a paper conveyance motor or the like for use in image forming apparatuses. It also relates to a motor driving apparatus and an image forming apparatus.

2. Description of the Related Art

The following description sets forth the inventor's knowledge of related art and problems therein and should not be construed as an admission of knowledge in the prior art.

For example, in image forming apparatuses, such as, e.g., MFP (Multi Function Peripherals) which are multifunction digital complex machines, a plurality of stepping motors are used to convey papers on which image data is to be printed and/or drive various mechanisms.

In such an image forming apparatus, in order to attain synchronization with imaging process for printing, register adjustment for full color printing, etc., it is required to control the speed (revolving speed) of the plurality of stepping motors with a high degree of accuracy. In addition, in order to meet the recent need of the productivity improvement and the image quality improvement for printing, it is also required to convey a paper at a stable rate when being printed and at the highest rate when not being printed.

A rough change in drive frequency at the time of accelerating/decelerating a stepping motor causes an increased risk of loss of synchronism (loss of synchronism between the control clock and the revolution) of the stepping motor. Therefore, in order to secure a margin against the loss of synchronism, it is required to change the drive frequency smoothly with a high degree of accuracy.

As will be understood from the above, in image forming apparatuses, etc., it is required to simultaneously accelerate/decelerate a plurality of stepping motors at different acceleration to different target revolution speeds with a high degree of accuracy. Thus, it has been desired to provide a variable frequency clock output circuit for motor driving which meets the above requests.

Conventionally, such variable frequency clocks were generated by software processing using a plurality of CPUs, memories, etc., which required complex structure and large software control load.

To cope with the aforementioned problems, Japanese Unexamined Laid-open Patent Publication No. H09-148896 proposes a clock output circuit capable of outputting a pulse signal having an arbitrary frequency without requiring interrupt processing to a CPU and/or a large memory space.

In this clock output circuit, a reference clock signal Fc is divided at previously set dividing ratio then outputted by a divider circuit, a basic clock signal Fb which is an output of the divider circuit is inputted into an acceleration/deceleration circuit, and an output signal Fout which is a pulse signal obtained by further dividing the basic clock signal Fb is outputted by the acceleration/deceleration circuit. The frequency of the output signal Fout of the acceleration/deceleration circuit changes based on input data set to a data register/control portion. The data register/control portion is configured to acquire data Sc set to an initial value register which is data for deciding a start-up frequency Fs, then read out the calculation result drawn by an accelerator/decelerator 4 upon receipt of an acceleration/deceleration request signal Sr from a timing generation circuit.

The clock output circuit disclosed by the aforementioned Japanese Unexamined Laid-open Patent Publication, however, is still complex in structure and only available to adjust acceleration a specified target frequency, resulting in difficulty in accelerating or decelerating a stepping motor to various target frequencies at different accelerations and lack of versatility.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a variable frequency clock output circuit and apparatus simple in structure and high in versatility and capable of accelerating or decelerating a motor to various target frequencies at different accelerations.

Among other potential advantages, some embodiments can provide a motor driving apparatus relatively simple in structure and high in versatility and capable of accelerating or decelerating a motor to various target frequencies at different accelerations.

Among other potential advantages, some embodiments can provide an image forming apparatus having the motor driving apparatus.

According to a first aspect of the preferred embodiment of the present invention, a variable frequency clock output circuit, comprising:

a target value register which stores a target value corresponding to an arbitrarily set target frequency;

an increase/decrease value register which stores an arbitrarily set increase/decrease value;

an adder-subtractor which has an input portion into which a current output value is inputted and outputs a calculation result obtained by adding/subtracting the increase/decrease value stored in the increase/decrease value register to/from the current output value inputted into the input portion based on an addition/subtraction instruction signal;

a comparator which compares an output value of the adder-subtractor to the target value stored in the target value register, and outputs an addition/subtraction instruction signal to the adder-subtractor until the output value of the adder-subtractor and the target value coincide; and a clock generator which outputs a clock signal having a frequency proportional to the output value of the adder-subtractor.

According to a second aspect of the preferred embodiment of the present invention, a variable frequency clock output apparatus has a plurality of variable frequency clock output circuits integrally modularized, wherein each of the variable frequency clock output circuits comprises:
a target value register which stores a target value corresponding to an arbitrarily set target frequency;
an increase/decrease value register which stores an arbitrarily set increase/decrease value;
an adder-subtractor which has an input portion into which a current output value is inputted and outputs a calculation result obtained by adding/subtracting the increase/decrease value stored in the increase/decrease value register to/from the current output value inputted into the input portion based on an addition/subtraction instruction signal;
a comparator which compares an output value of the adder-subtractor to the target value stored in the target value register, and outputs an addition/subtraction instruction signal to the adder-subtractor until the output value of the adder-subtractor and the target value coincide; and
a clock generator which outputs a clock signal having a frequency proportional to the output value of the adder-subtractor.

According to a third aspect of the preferred embodiment of the present invention, a motor driving apparatus is equipped with a variable frequency clock output circuit and a driving circuit which drives a motor based on a clock outputted from the clock output circuit, wherein the variable frequency clock output circuit comprises:
a target value register which stores a target value corresponding to an arbitrarily set target frequency;
an increase/decrease value register which stores an arbitrarily set increase/decrease value;
an adder-subtractor which has an input portion into which a current output value is inputted and outputs a calculation result obtained by adding/subtracting the increase/decrease value stored in the increase/decrease value register to/from the current output value inputted into the input portion based on an addition/subtraction instruction signal;
a comparator which compares an output value of the adder-subtractor to the target value stored in the target value register, and outputs the addition/subtraction instruction signal to the adder-subtractor until the output value of the adder-subtractor and the target value coincide; and
a clock generator which outputs a clock signal having a frequency proportional to the output value of the adder-subtractor.

According to a fourth aspect of the preferred embodiment of the present invention, a motor driving apparatus is equipped with a variable frequency clock output circuit and a plurality of driving circuits which drive a plurality of motors based on a clock outputted from each variable frequency clock output circuits of the clock output apparatus, wherein the variable frequency clock output apparatus includes a plurality of variable frequency clock output circuits which are integrally modularized, and
wherein each of the variable frequency clock output circuit comprises:
a target value register which stores a target value corresponding to an arbitrarily set target frequency;
an increase/decrease value register which stores an arbitrarily set increase/decrease value;
an adder-subtractor which has an input portion into which a current output value is inputted, and outputs a calculation result obtained by adding/subtracting the increase/decrease value stored in the increase/decrease value register to/from the current output value inputted into the input portion based on an addition/subtraction instruction signal;
a comparator which compares an output value of the adder-subtractor to the target value stored in the target value register, and outputs the addition/subtraction instruction signal to the adder-subtractor until the output value of the adder-subtractor and the target value coincide; and
a clock generator configured to output a clock signal having a frequency proportional to the output value of the adder-subtractor.

According to a fifth aspect of the preferred embodiment of the present invention, an image forming apparatus, comprising:
one or a plurality of paper conveyance motors;
a motor driving apparatus which drives the paper conveyance motors; and
a printer which prints on a paper conveyed by the paper conveyance motors,
wherein the motor driving apparatus is equipped with a variable frequency clock output circuit and a driving circuit which drives a motor based on a clock outputted from the clock output circuit, and
wherein the variable frequency clock output circuit comprises:
a target value register which stores a target value corresponding to an arbitrarily set target frequency;
an increase/decrease value register which stores an arbitrarily set increase/decrease value;
an adder-subtractor which has an input portion into which a current output value is inputted, and outputs a calculation result obtained by adding/subtracting the increase/decrease value stored in the increase/decrease value register to/from the current output value inputted to the input portion based on an addition/subtraction instruction signal;
a comparator which compares an output value of the adder-subtractor to the target value stored in the target value register, and outputs the addition/subtraction instruction signal to the adder-subtractor until the output value of the adder-subtractor and the target value coincide; and
a clock generator which outputs a clock signal having a frequency proportional to the output value of the adder-subtractor.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
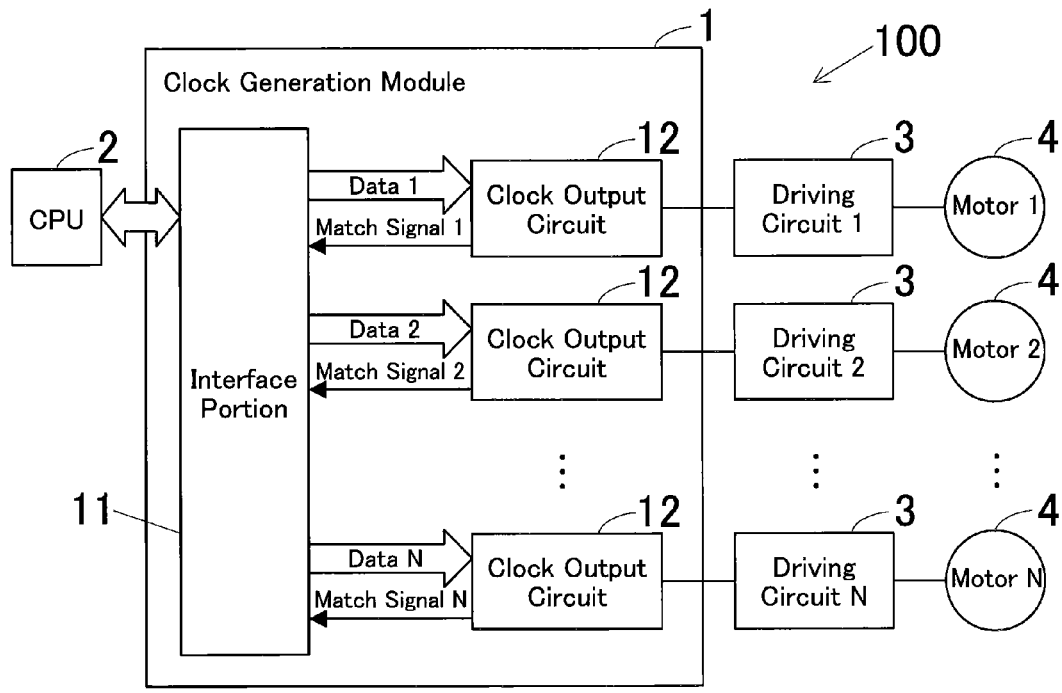
FIG. 1 is a block diagram showing a motor driving apparatus using a variable frequency clock output circuit according to an embodiment of the present invention.

FIG. 1 is a block diagram showing a motor driving apparatus using a variable frequency clock output circuit (hereinafter simply referred to as "clock output circuit") according to an embodiment of the present invention.

This motor driving apparatus 100 is equipped with one clock generation module 1, one CPU 2 and one or a plurality of motor driving circuits 3. A plurality of motor driving circuits 3 perform a drive control of a plurality of motors 4.

The clock generation module 1 is a valuable frequency clock output apparatus (hereinafter simply referred to as a "clock output apparatus") in which an interface portion 11 and one or a plurality of clock output circuits 12 are integrally modularized. The interface portion 11 is a circuit for connecting the CPU 2 and the clock output circuit 12, and is configured to send written data from the CPU 2 to the clock output circuit 12 and also send a match signal from the clock output circuit 12 to the CPU 2.

In this embodiment, the interface portion 11 employs an address/data bus interface method in which the match signal is read out by the CPU 2 via a bus interface. In place of the above, the match signal can be detected by direct connection to the CPU 2. Alternatively, the match signal can be detected via an I/O extension module (not shown in FIG. 1).

The CPU 2 is configured to write various data into the clock output circuit 12 in the clock generation module 1.

From the clock generation module 1, a single-phase or multi-phase clock signal is transmitted to the motor driving circuit 3. Since it is not important to explain control signals other clock signals in this embodiment here, such explanation will be omitted here.

The data to be given to the clock output circuit 12 is one set of data including a target value T, an increase/decrease value S, a forcible rewrite instruction signal, an output ON/OFF signal, etc.

Figure 2:
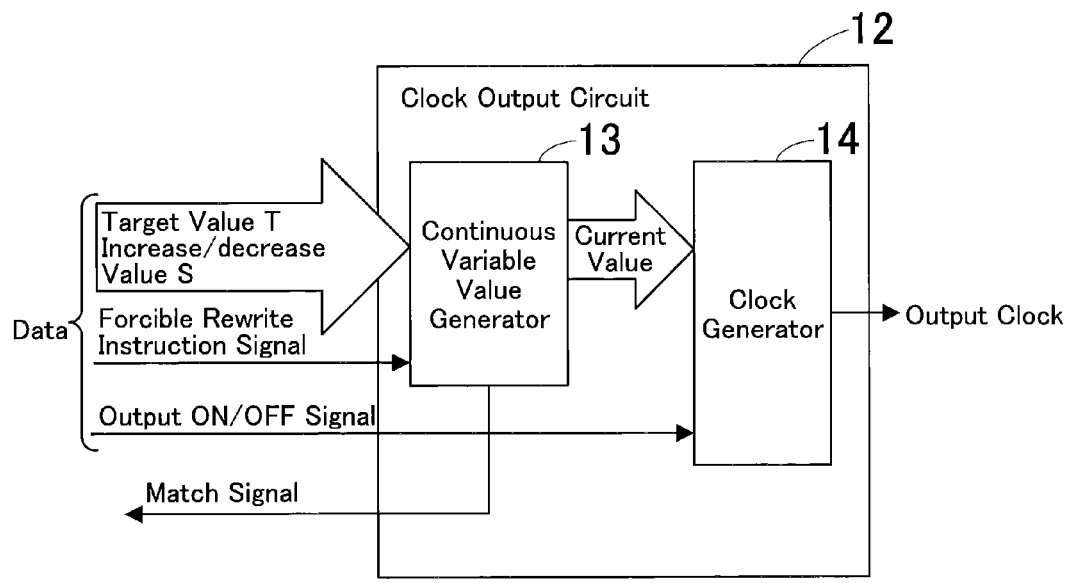
FIG. 2 is a block diagram showing a variable frequency clock output circuit.

FIG. 2 is a block diagram of the clock output circuit 12.

This clock output circuit 12 has a continuous variable value generator 13 and a clock generator 14.

The continuous variable value generator 13 outputs a value referred to as "current value" to be inputted into the clock generator 14. The clock generator 14 generates a frequency proportional to the current value. The internal operations of the continuous variable value generator 13 and the clock generator 14 will be explained later.

Among the data written in the interface portion 11 by the CPU 2, the target value T, the increase/decrease value S, and the forcible rewrite instruction signal are inputted into the continuous variable value generator 13, and the output ON/OFF signal is inputted in the clock generator 14. The continuous variable value generator 13 outputs a match signal (whose function will be explained later).

Figure 3:
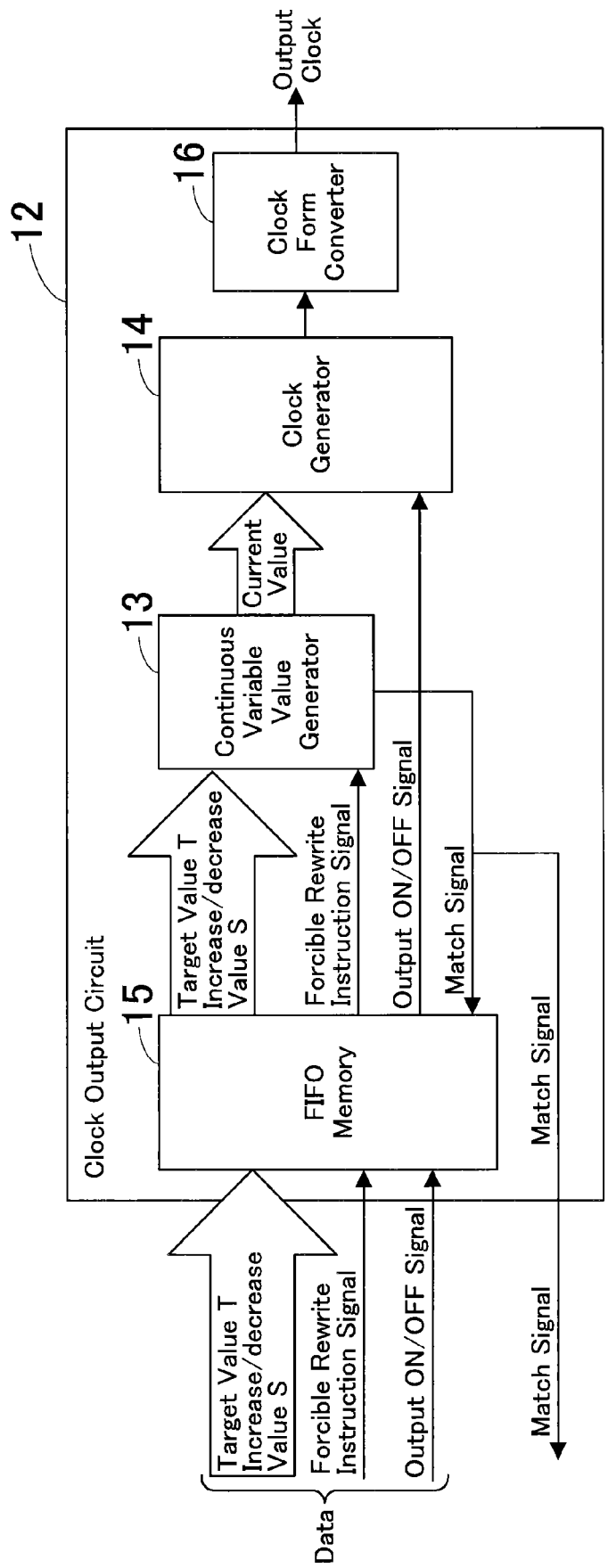
FIG. 3 is a block diagram showing a variable frequency clock output circuit using a FIFO register.

In the embodiment shown in FIG. 2, data and a match signal are directly transmitted/received between the interface portion 11 and each of the clock output circuits 12. Alternatively, as shown in FIG. 3, a FIFO register (First In, First Out register) (FIFO memory) 15 can be inserted into the input stage of each of the clock output circuits 12, or a clock form converter 16 can be further inserted into the final stage thereof.

In the embodiment shown in FIG. 2, the data write control at the date update timing should be performed by the CPU 2. Meanwhile, if the FIFO register 15 is employed as mentioned above, it becomes possible to make the FIFO register 15 execute the data write control, which eliminates the need of the data write control at appropriate timing. It is recommended to use a multi-stage FIFO register with respect that the acceleration can be adjusted to a target value in a stepwise manner.

The clock pattern required by the driving circuit 3 shown in FIG. 1 differs depending on, e.g., the type or the excitation system of the stepping motor. To cope with the issue, the clock form converter 16 has a function of converting the output of the clock generator 14 into a clock form (clock pattern) that is the most appropriate for the driving circuit 3.

For example, for a driving circuit 3 requiring a two-phase clock signal, it is required to convert a single-phase clock signal into a two-phase clock signal. This conversion is performed by the clock form converter 16. The clock form converted by the clock form converter 16 can be fixed, and the driving circuit can be configured to switch a single-phase signal to a two-phase signal like in the aforementioned embodiment.

Figure 4:
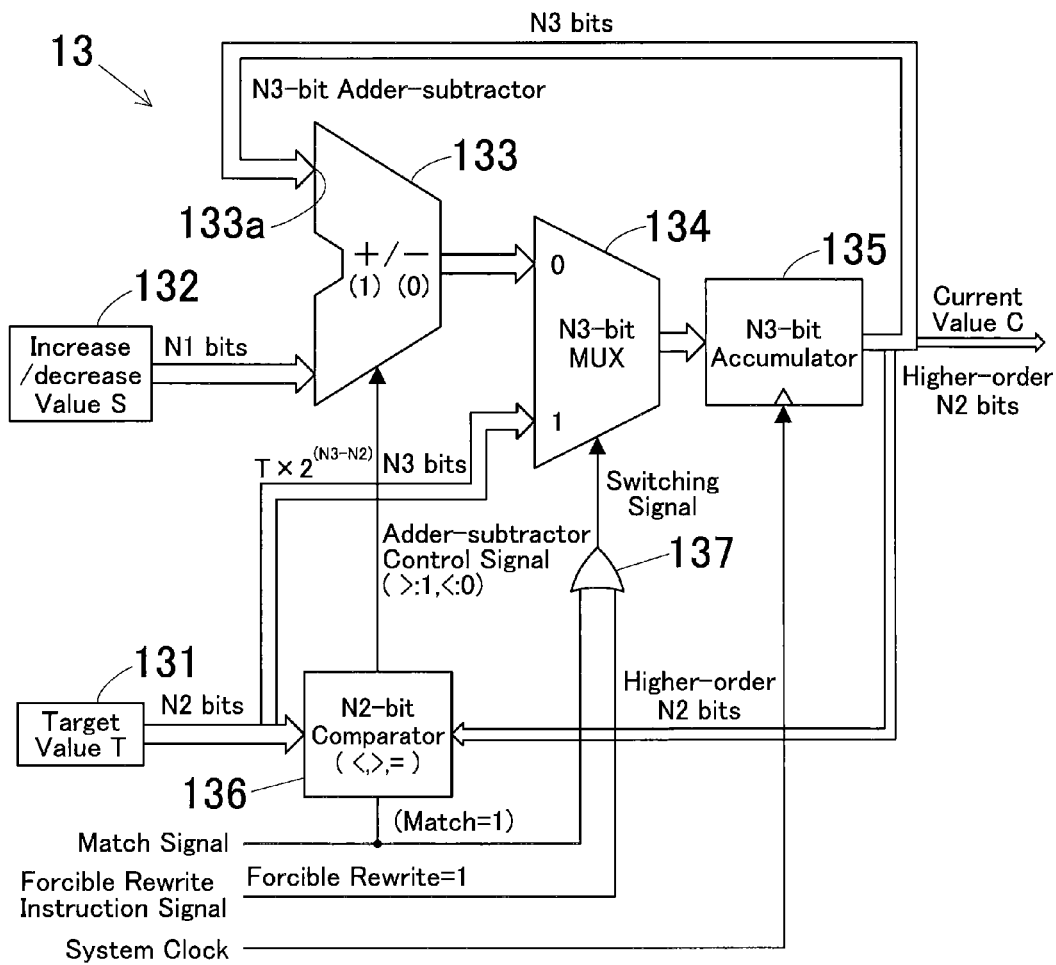
FIG. 4 is a concrete structural view showing a continuous variable value generator.

FIG. 4 shows a concrete structure of the continuous variable value generator 13.

This continuous variable value generator 13 is equipped with a target value register 131, an increase/decrease value register 132, an adder-subtractor 133, a selector 134, an accumulator 135, a comparator 136, and an OR circuit 137.

In the target value register 131, a target value T corresponding to an arbitrarily set target frequency is written in N2 bits. In the increase/decrease value register 132, an arbitrarily set increase/decrease value S is written in N1 bits. In this embodiment, the increase/decrease value S is a fractional value.

In this embodiment, the adder-subtractor 133 is represented by N3 bits which value includes a fractional value, and has an input portion 133a into which an output value of the accumulator 135 is inputted. Based on the adder-subtractor control signal outputted from the comparator 136, the adder-subtractor 133 adds/subtracts the increase/decrease value S stored in the increase/decrease register 132 to/from the value inputted into the input portion 133a and outputs the calculation result.

The selector 134 is a multiplexer (referred to as a "MUX" in Figure) represented by N3 bits, and selects either the output of the adder-subtractor 133 or the target value based on the switching signal outputted from the OR circuit 137, then outputs the selected value.

The accumulator 135 is represented by N3 bits. This accumulator 135 is a register for holding the output value of the selector 134, which acquires and holds the output value of the selector 134 at every source clock (also referred to as a "system clock").

The comparator 136 is represented by N2 bits, and compares the higher-order N2 bits of the output value currently outputted from the accumulator 135 to the higher-order N2 bits of the target value T stored in the target value register 131, and then outputs a match signal and an adder-subtractor control signal.

The OR circuit 137 is configured to output a switching signal that is a logical sum of the match signal outputted from the comparator 136 and a forcible rewrite instruction signal for forcibly making the output value of the accumulator 135 the target value T.

Next, the operation of the continuous variable value generator 13 shown in FIG. 4 will be explained.

In this explanation, the higher-order N2 bits of the output of the accumulator 135 will be referred to as a current value C. When the comparator 136 is in a matched state, the current value C=(is equivalent to) the target value T and the N3-bit selector 134 selects the target value T.

At this time, the target value T is inputted into the higher-order position of the selector 134. The remaining bits in the lower-order position ("N3−N2" bits) are all 0. This is equivalent to the state in which the target value $T \times 2^{(N3-N2)}$ is inputted into the higher-order position of the selector 134.

The N3-bit accumulator 135 acquires the output of the selector 134 at every system clock. At this time, since the output of the selector 134 is kept constant (the target T), the accumulator 135 is keeping the same value. The current value C which is the higher-order N2 bits of the output of the accumulator 135 is equivalent to the target value T as mentioned above.

In this state in which the forcible rewrite instruction signal is 0 (no forcible rewrite is performed), when a new target value T1 is written, the output of the comparator 136 changes. When the written target value T1 is larger than a current value C0 (=a target value T0 written before the target value T1), the match signal becomes 0 and the adder-subtractor control signal becomes 1. As a result, the adder-subtractor 133 performs an add operation.

Furthermore, since the match signal became 0, the switching signal of the selector 134 becomes 0 to switch to the mode in which the output of the adder-subtractor 133 is directed to the accumulator 135.

Figure 5:
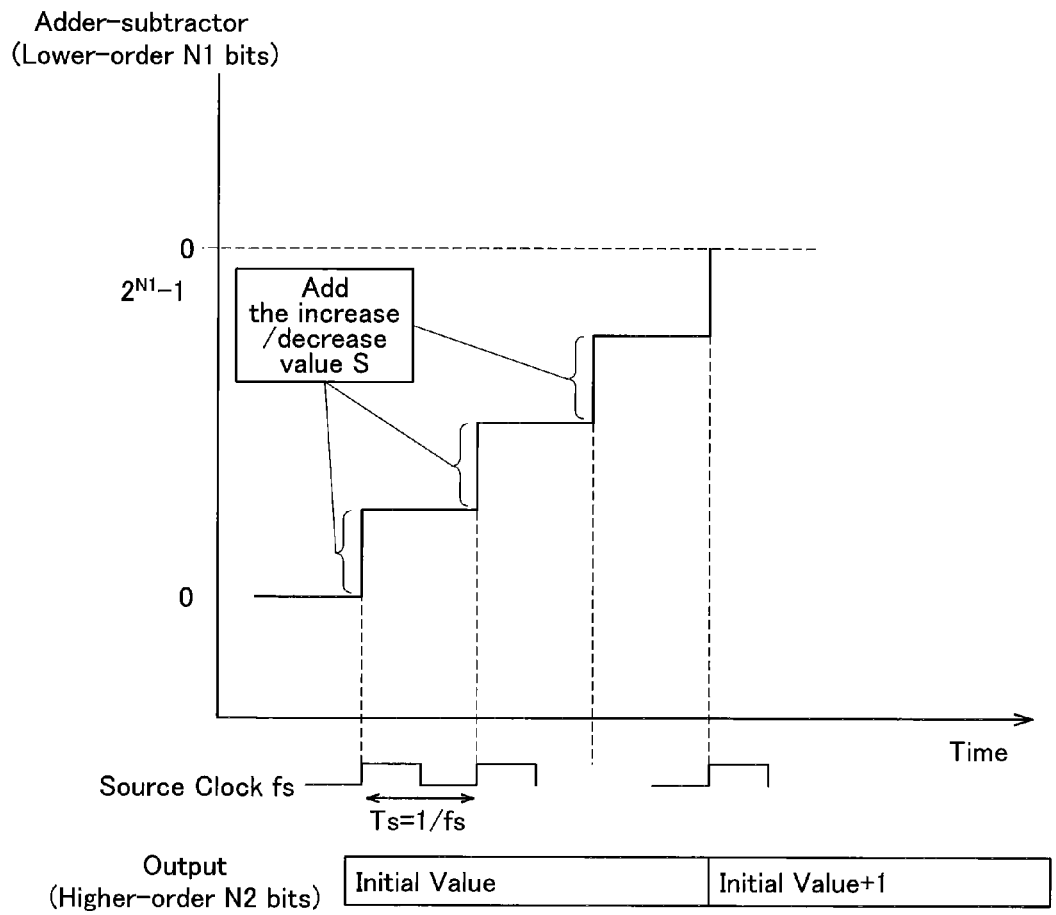
FIG. 5 is a graph showing the relationship between the output of the adder-subtractor of the continuous variable value generator and the time.

The value A held by the accumulator 135 is represented by the formula:

$$A(n)=A(n-1)+S$$

wherein "A(n−1)" is a value of the accumulator 135, which is latched at the preceding system clock right before the current one, and "S" is the aforementioned increase/decrease value. That is, as shown in FIG. 5, the adder-subtractor 133 adds the increase/decrease value S to the value of the accumulator 135 at every source clock (system clock).

As a result of the repeating additions, the higher-order N2 bits (=the current value) of the accumulator 135 become equal to the target value T1.

Here, if N5=N3−N2, this means that the increase/decrease value S has been added from $T0 \times 2^{N5}$ to $T1 \times 2^{N5}$ in the add operation. The difference number thereof is indivisible by the increase/decrease value S in the most cases, and therefore a fraction remains in the lower-order N5 bits. The fractions will be reset to 0.

The time t required for the target value to change from T0 to T1 will be represented by the following equation:

$$t=(T1-T0)*2^{N5}/S*Ts$$

where Ts is a cycle of the system clock.

If the frequency of the system clock is fs, the decrease/increase value S to be set when it is desired that the value of the accumulator 135 is changed from the arbitrary target value T0 to the target value T1 in the time t, will be defined by:

$$S=(T1-T0)*2^{N5}/(fs*t).$$

The reason for resetting the fraction of the accumulator 135 to 0 when the current value C becomes equivalent to the target value T as mentioned above, is to prevent possible errors in the variable time t by the fraction, which may be observed if the add operation starts from the state in which the previous fraction still remains when a new target value is written.

The above explanation is directed to the case in which the target values keep T1>T0 and the adder-subtractor 133 performs an add operation. To the contrary, in the case in which a target value smaller than the current value C0 (=T0) is written, the adder-subtractor control signal of the comparator 136 becomes 0, and therefore the adder-subtractor 133 performs a subtraction operation.

In the case of the subtraction operation, basically in the same manner as in the add operation, a variable operation will be performed until reaching a target value. However, the value A held by the accumulator 135 is calculated by the formula:

$$A(n)=A(n-1)+(-S)$$

Therefore, the increase/decrease value is calculated by the formula:

$$S=(T0-T1)*2^{N5}/(fs*t)$$

which is different from that of the add operation.

The selector 134 selects the target value T when it received a forcible rewrite instruction signal. That is, in FIG. 4, when the new target value T1 is written and a forcible rewrite instruction signal is 1, even if the current value C and the target value T1 are not equivalent to each other, the selector 134 forcibly selects the new target value T1.

As a result, when a system clock is inputted once, the accumulator 135 is forcibly set to the value of T1×$2^{N5}$. Then, the current value C0 (=T0) immediately changes to C1 (=T1) without a variable operation.

As to the bit width of each portion, it is required to meet the condition of N3≧N1+N2. If the aforementioned condition is not met, an add/subtraction operation of the increase/decrease value S is performed, resulting in a state in which the current value C never becomes equivalent to the target value T1 in the process to reach the target value T. That is, if the aforementioned condition is satisfied, the current value C only changes by ±1 at the maximum by a single add/subtraction operation. However, if the aforementioned condition is not satisfied, the current value C may sometimes change by more than ±1, for example, ±2. If this happens, the current value C skips the target value T1 in the add operation, then the operation will be switched to a subtraction operation.

In the subtraction operation, the current value C may sometimes skip the target value T1 again. As a result, the current value T1 would never become equivalent to the target value T1, which may cause vibration of the current value C.

Next, the clock generator 14 shown in FIG. 2 will be explained.

Figure 6:
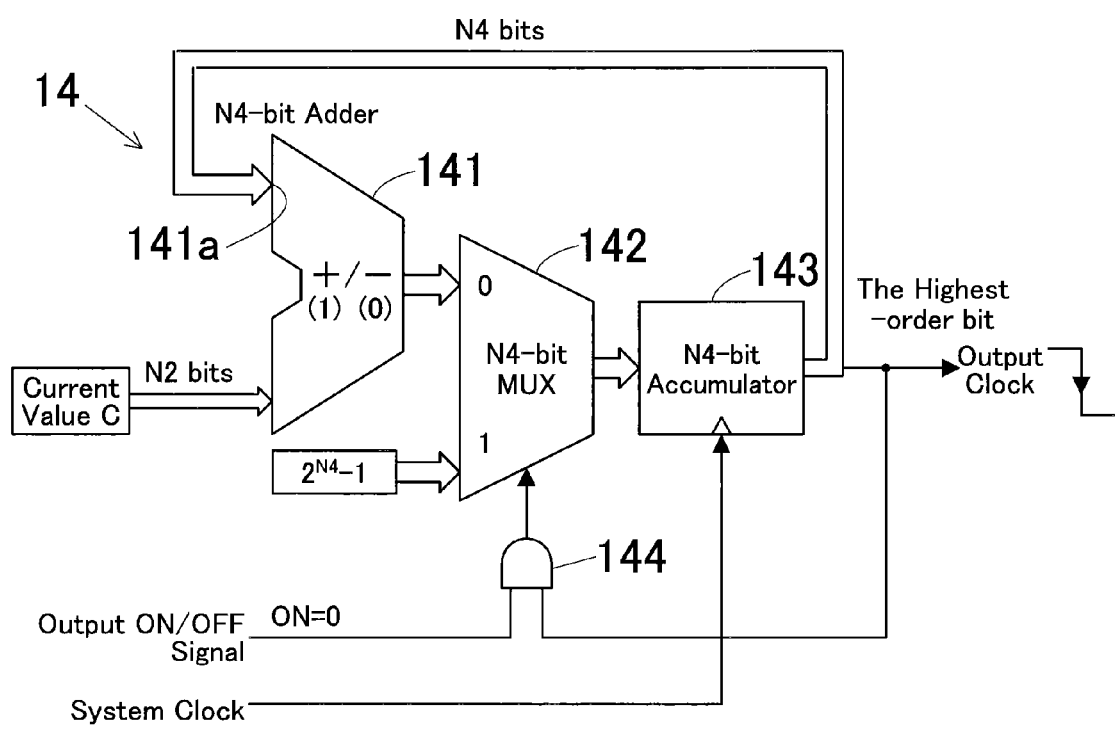
FIG. 6 is a concrete structural view of a clock generator.

FIG. 6 shows a concrete structure of the clock generator 14.

This clock generator 14 is equipped with an adder 141, a selector 142, an accumulator 143, and an AND circuit 144.

The adder 141 is represented by N4 bits, and has an input portion 141a into which an output value of the accumulator 143 is inputted. The adder 141 adds the current value C outputted from the continuous variable value generator 13, i.e., N2 bits which are integral and higher-order ones of the output of the adder-subtractor 133, to the value inputted into the input portion 141a, and then outputs the result. Here, the relation between N2 and N4 is N2≦N4.

The selector 142 is a multiplexer represented by N4 bits, and selects either the output of the adder 141 or a fixed value ("$2^{N4}-1$" that means all of the bits are 1 in this embodiment) based on the selection signal outputted from the OR circuit 144, and then outputs the selected value.

The accumulator 143 is represented by N4 bits. This accumulator 143 is a register for holding the output value of the selector 142, and configured to acquire and hold the output value of the selector 142 at every source clock (system clock). The highest-order bit of this accumulator 143 will be outputted as an output clock.

The AND circuit 144 outputs a selection signal, which is a logical product of an output ON/OFF signal for instructing whether the output clock is to be outputted or stopped and the output clock outputted from the accumulator 143, to the selector 142.

Next, the operation of the clock generator 14 shown in FIG. 6 will be explained.

Figure 7:
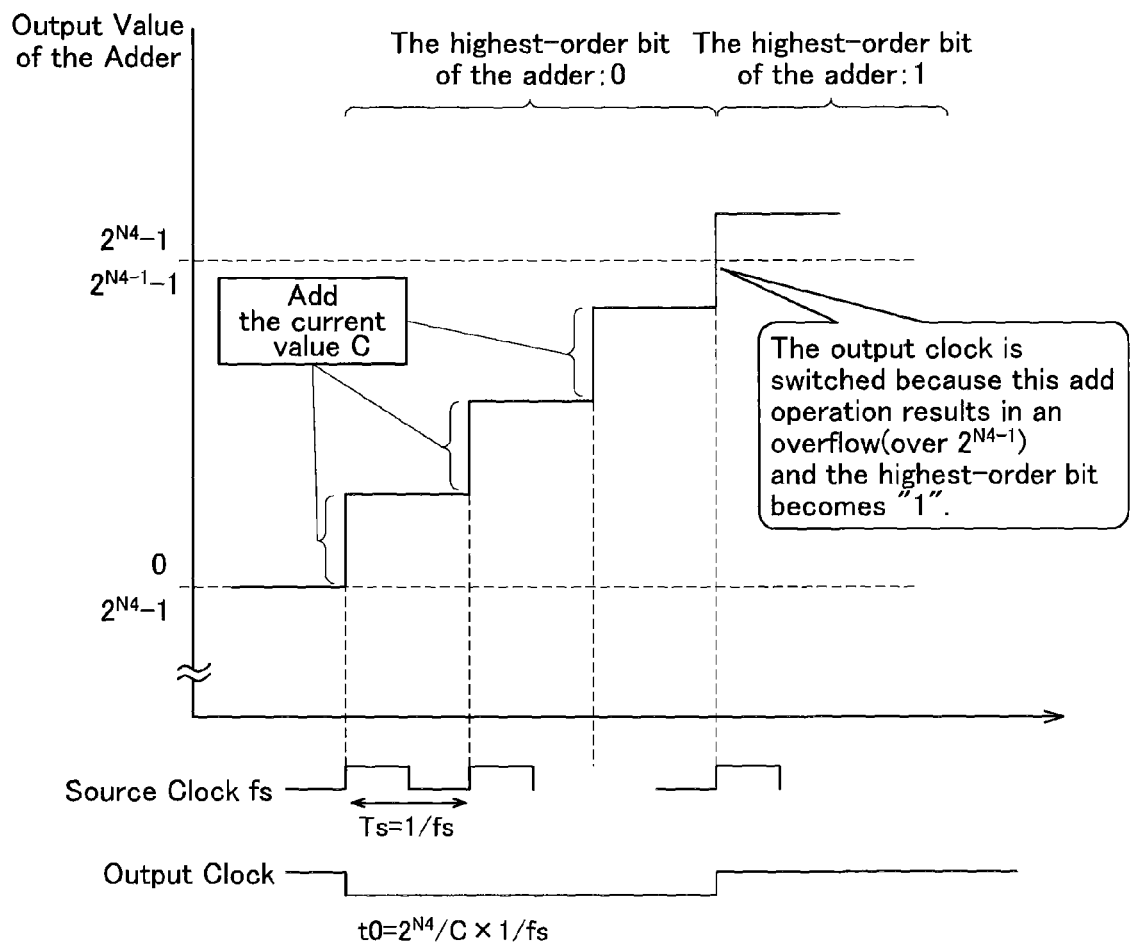
FIG. 7 is a graph showing the relationship between the output of the adder of the clock generator and the time.

When the output ON/OFF signal is set to 0 (=ON), the selector 142 selects the output of the adder 141 and sets a new addition result that is obtained by adding the current value C to the previous addition result (output of the accumulator 143) at every system clock. In other words, as shown in FIG. 7, the adder 141 continuously adds the current value C to the output value of the accumulator 143 at every system clock.

When the highest-order bit of the addition result is raised from 0 to 1 as a result of the repeated additions of the current value C, the output clock changes from a low level (Lo) to a high level (Hi).

When the highest-order bit becomes from 1 to 0 as a result of the overflow of the output of the adder 141 due to consecutive additions, the output clock changes from Hi to Lo.

Thus, the current value C is repeatedly added at every system clock. As a result, the cycle which overflows the value represented by N4 bits becomes a cycle of the output clock. Therefore, the cycle T of the output clock is represented by:

$$T=2^{N4}/C*Ts$$

where the cycle of the system clock is Ts. Thus, the frequency f of the output clock is represented by:

$$f=fs/2^{N4}C$$

wherein fs is a frequency of the system clock. As a result, a clock having a frequency proportional to the current value C will be outputted.

If the output ON/OFF signal is set from 0 (output) to 1 (Stop) when the clock is being outputted, the output clock stops. This stop timing is decided by the logic of the output clock. In the case of FIG. 6, if the output clock is 0 (Lo) when the output ON/OFF signal is set to 1, the selector 142 still selects the adder 141. Therefore, the clock would not stop. When the output clock becomes 1 (Hi), the selector 142 selects the fixed value. Thus, the fixed value (in this embodiment, all bits are 1 as mentioned above) is set to the accumulator 143.

If the output clock is 1 (Hi) when the output ON/OFF signal is set to 1, the selector 142 immediately selects the fixed value side. Thus, all bits of the output of the selector 142 become 1.

With this operation, the clock immediately stops when an output OFF instruction is outputted and the logic of the output clock becomes 1, which prevents a clock with an improper width from being outputted.

That is, when the logic of the output clock becomes 1 after the output ON/OFF signal became OFF (1), the clock stops.

When the output ON/OFF signal is set to ON (0), the selector 142 selects the adder 141 to resume the clock output. However, since all of the bits of the accumulator 143 became 1 during the clock output is stopped, the output clock certainly changes from Hi to Lo at the next system clock as long as the current value is not 0.

With this configuration, the clock will be immediately outputted at the timing of activating the stepping motor by the CPU 2, which prevents occurrence of control errors due to the gap in the activation timing.

In this embodiment, the output clock assuredly changes from Hi to Lo at the output initiation, which enables the driving of the motor 4 at the falling edge. However, some motor driving circuits 3 may prefer the reverse case. In such cases, the clock output can be reversed, or only the highest-order bit of the fixed value can be set to 0 and the remaining bits of the fixed value are set to 1 instead of setting all of the bits to 1.

If all of the bits are 1 except the highest-order bit, the highest-order bit (=output clock) assuredly changes from Lo to Hi at the initial system clock by the current value addition at the time of the resumption. In this case, it is necessary to reverse the highest-order bit signal to be inputted into the AND circuit 144 which decides the selection signal to the selector 142.

As mentioned above, the highest-order bit of the output of the selector 142 can be set to 0 or 1 at the time of the next add-subtraction operation, which enables driving the motor at the rising edge and also the falling edge of the output clock depending on the driving circuit 3 of the motor, resulting in an increased freedom degree of the motor driving control.

Figure 14A:
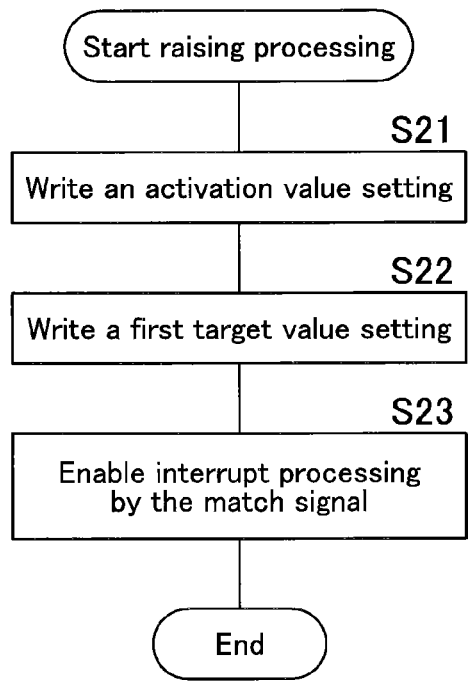
FIGS. 14(A) and 14(B) are flowcharts showing another example of a control to be performed by a CPU to write in the clock generator module in the case of performing a motor rising control as shown in FIG. 9.

The above explanation is directed to the case where the output ON/OFF signal is set to 0 (ON=0). However, the same operation can also be performed in the case where the output ON/OFF signal is set to 1 (ON=1). In FIG. 14, the AND circuit 144 is used. In some cases, however, an OR circuit (a logical sum) may be used depending on the combination of a "suspended logic" of the output clock, an "off-defining logic" of an output ON/OFF signal, and a "switching logic" of the selector 142.

As explained above, inputting the current value outputted by the continuous variable value generator 13 shown in FIG. 4 into the clock generator 14 makes it possible to generate an output clock that is continuously varied. This output clock is a continuous variable clock considered to be preferable at the time of performing an acceleration/deceleration control of a stepping motor. Setting a target value and an increase/decrease value to the target value register 131 and the increase/decrease value register 132 respectively enables an automatic continuous variable operation. Furthermore, since a timer table for acceleration/deceleration is no longer required, it becomes possible to obtain a clock output having a target frequency, by a relatively simple structure compared with a conventional one.

In a start-up (activation) control of a stepping motor, the activation is often initiated from a somewhat low frequency. In such a case, the activation control is performed as follows.

Initially, the output ON/OFF signal of the clock generator 14 is set to OFF, the forcible rewrite instruction signal of the continuous variable value generator 13 is set to a forcible rewrite (1), and a target value T0 corresponding to the activation frequency is set.

Next, a target value T1 having a frequency at which a stepping motor is to be rotated eventually and an increase/decrease value S1 calculated from a desired variable time t1 are set. At this time, the output ON/OFF signal is simultaneously set to ON.

At this time, the current value C which is an output value of the continuous variable value generator 13 has already become C0 equal to an activation target value T0, and therefore the activation frequency is outputted.

At the same time, as the continuous variable value generator 13 performs add operations towards the target value T, the current value C increases. The frequency corresponding to the increase of the current value C is outputted from the clock generator 14.

After passing a variable time t1, the stepping motor reaches a constant output at a frequency corresponding to the target value T1 to be eventually reached. Thus, the activation of the stepping motor is completed.

In a falling (stopping) control of a stepping motor, the stepping motor is decelerated to a rather low frequency other than 0, then stopped. In such a case, the stopping control is performed as follows.

Initially, when a stepping motor is being driven at a constant frequency (target value T1), a target value T2 having a frequency at which the stepping motor is to be eventually reached and an increase/decrease value S2 calculated from a desired variable time t2 are set. As a result, the continuous variable value generator 13 performs subtraction operations towards the target value T2, and the current value C decreases accordingly.

A frequency corresponding to the decrease of the current value C will be outputted from the clock generator 14. After passing the variable time t2, it reaches the frequency corresponding to the target value T2 to be eventually reached. As mentioned above, at this time, a match signal will be outputted.

At the write control side, the changes of the match signal are monitored. When it is detected that the match signal is changed from 0 to 1, the output ON/OFF signal to be outputted to the clock generator 14 is switched to OFF.

Figures 8A, 8B:
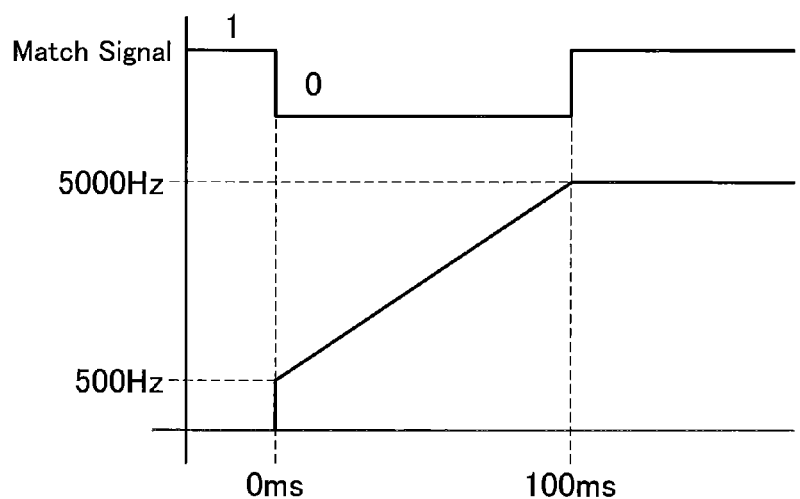
FIGS. 8(A) and 8(B) are examples of set data in a table and a rising pattern in a graph, in the case of accelerating a stepping motor in 100 ms from an activation frequency of 500 Hz to a target frequency of 5,000 Hz.

FIG. 8 shows an example of a rising pattern (see FIG. 8(B)) and the set data (see FIG. 8(A)) in which a stepping motor is accelerated in 100 ms from an activation frequency of 500 Hz to a target frequency of 5,000 Hz. In FIG. 8, the source clock is 1.0 MHz, and the bit widths N1-N4 of portions shown in FIGS. 4 and 6 are N1=16, N2=16, N3=32 and N4=22, respectively. These values are common in FIGS. 9, 10 and 11.

There are two sets of data to be written in the clock generation module 1. One of them is for setting an activation value. In this example, since the forcible rewrite instruction signal is ON and the output ON/OFF signal is OFF, the clock is not outputted and the activation frequency is set to 500 Hz. At this time, an increase/decrease value S has no role. Therefore, no value is required to be written in the module 1. Alternatively, a dummy value can be written in the module 1.

The other set of data is for setting a final target value. At this time, since the output ON/OFF signal is ON, the clock is outputted and a rising operation is performed from 500 Hz to 5,000 Hz in 100 ms.

Figures 9A, 9B:
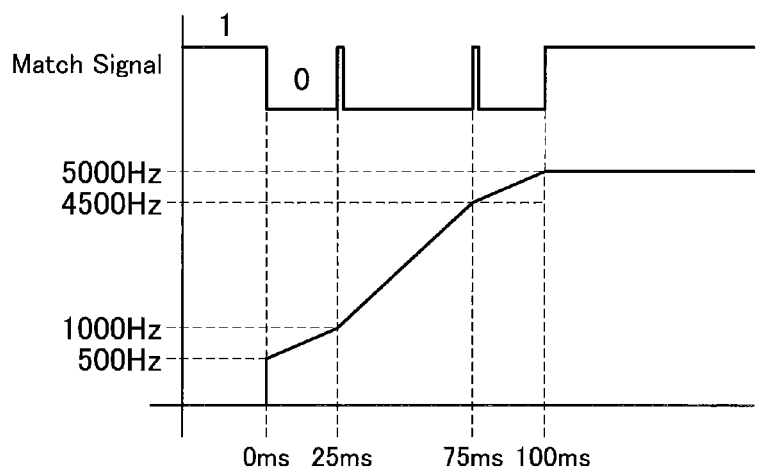
FIGS. 9(A) and 9(B) are examples of set data in a table and a falling pattern in a graph, in the case of accelerating a stepping motor in three steps, in 100 ms from an activation frequency of 500 Hz to a target frequency of 5,000 Hz.

FIG. 9 shows an example of a rising pattern (see FIG. 9(B)) and set data (see FIG. 9(A)) in which a stepping motor is accelerated in three steps, in 100 ms from the activation frequency of 500 Hz to the target frequency of 5,000 Hz.

In FIG. 9, there are two braking points on the edge and the motor is accelerated in an approximate sign curve in three step zones different in acceleration.

The operation up to the setting of the first target value is the same as in the case shown in FIG. 8.

When the frequency reaches 1,000 Hz that is a first target value, the match signal becomes ON (=1) as mentioned above, the CPU monitors the timing that the signal level changes from 0 to 1 and performs the setting of the second target value.

When a second target value is set, the output clock again starts rising towards the next target of 4,500 Hz. Simultaneously with this setting, the match signal again becomes from 1 to 0.

When the output clock reaches the second target value, since the match signal again becomes from 0 to 1, a final target value is set in the same manner as mentioned above. Thus, the raising control up to the final target value of 5,000 Hz will be completed.

Figures 10A, 10B:
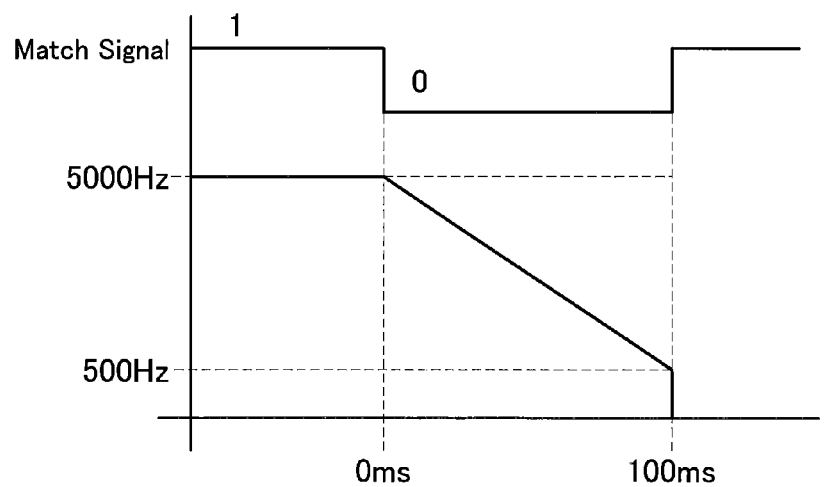
FIGS. 10(A) and 10(B) are examples of set data in a table and a falling pattern in a graph, in the case of decelerating a stepping motor in 100 ms from an activation frequency of 5,000 Hz to a target frequency of 500 Hz.

FIG. 10 shows an example of a falling pattern (see FIG. 10(B)) and the set data (see FIG. 10(A)) in which the stepping motor is decelerated in 100 ms from the frequency of 5,000 Hz to the target frequency of 500 Hz.

There are two sets of data to be written in the clock generation module 1. When a stop value setting is performed with one set of data, the output clock starts decreasing in frequency towards 500 Hz. Since the match signal changes from 0 to 1 when the output clock reaches 500 Hz, the CPU 2 monitors the timing that the level of this signal changes from 0 to 1 and performs the next pulse stop setting. As a result, the output clock stops and the falling control is completed thereby. At this time, an increase/decrease value S has no role. Therefore, no value is required to be written in the module 1. Alternatively, a dummy value can be written in the module 1.

Figures 11A, 11B:
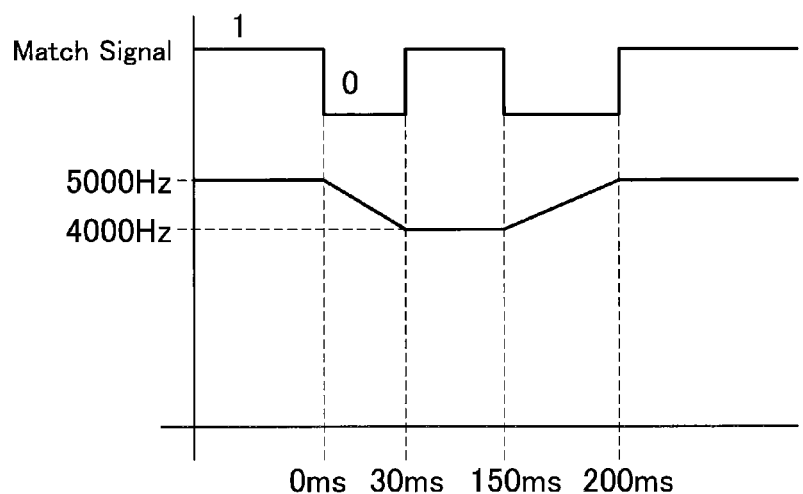
FIGS. 11(A) and 11(B) are examples of set data in a table and a falling and restoring pattern in a graph, in the case of deceleration/restoration control in which a stepping motor is decelerated in 30 ms from 5,000 Hz to 4,000 Hz and then restored in 50 ms from 4,000 Hz to 5,000 Hz.

FIG. 11 shows an example of a rising pattern (see FIG. 11(B)) and the set data (see FIG. 11(A)) in the case of a deceleration-restoration control in which a stepping motor is decelerated in 30 ms from 5,000 Hz to 4,000 Hz and then restored in 50 ms from 4,000 Hz to 5,000 Hz. This control can be performed, for example, to adjust a conveyance position of a paper in an image forming apparatus.

The data to be written in the clock generation module 1 includes one set of data for deceleration and one set of data for restoration. When the deceleration is set, the output clock starts decreasing in frequency towards 4,000 Hz. At this time, the match signal becomes 0.

When it reaches 4,000 Hz, the match signal changes from 0 to 1. Therefore, the CPU 2 can recognize that the output clock has reached the decelerated state by monitoring the timing that the level of this signal changes from 0 to 1.

When a restoration setting is performed after the decelerated state has been continued for a desired time period (120 ms in this embodiment), the frequency starts increasing towards 5,000 Hz.

The change of the match signal at this time is the same as at the time of the deceleration. Therefore, the CPU 2 can recognize the restoration by monitoring the timing that the level of this signal changes from 0 to 1.

The change time has been previously decided. Therefore, it is possible to know the completion of deceleration and the completion of acceleration by waiting for the time at the software side without monitoring the match signal.

Figure 12:
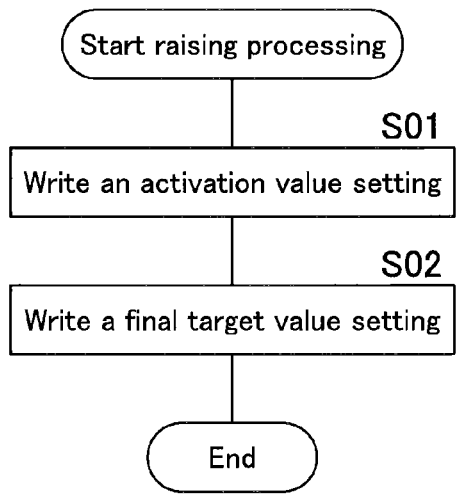
FIG. 12 is a flowchart showing an example of a control to be performed by a CPU to write in the clock generation module in the case of performing a motor rising control as shown in FIG. 8.

FIG. 12 is a flowchart showing an example of a control to be performed by the CPU 2 shown in FIG. 1 to write in the clock generation module 1 in the case of performing a raising control of the motor as shown in FIG. 8.

At Step S01, an activation value setting is written. At Step S02, a final target value setting is written.

Figure 13:
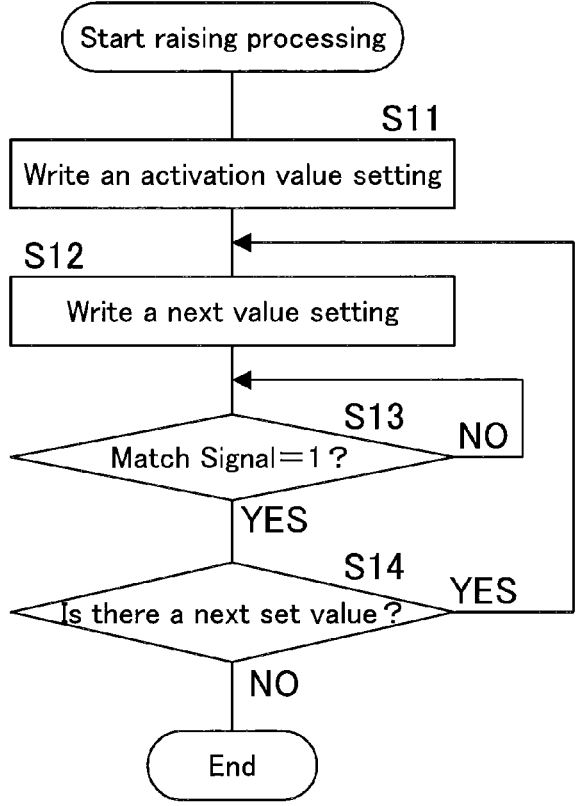
FIG. 13 is a flowchart showing an example of a control to be performed by a CPU to write in the clock generator module in the case of performing a motor rising control as shown in FIG. 9.

FIG. 13 is a flowchart showing an example of a control to be performed by the CPU 2 shown in FIG. 1 to write in the clock generation module 1 in the case of performing a raising control of a motor as shown in FIG. 9.

At Step S11, an activation value setting is written. At Step S12, a next target value setting is written. At Step S13, it is monitored that the match signal becomes 1. When the match signal becomes 1 (YES at Step S13), it is discriminated whether there is a next set value at Step S14. If there is a next set value (YES at Step S14), the routine returns to Step S12. To the contrary, if there is no next set value (NO at Step S14), the processing terminates.

FIG. 14 is a flowchart showing another example of a control to be performed by the CPU 2 shown in FIG. 1 to write in the clock generation module 1 in the case of performing a raising control of a motor as shown in FIG. 9.

In the control shown in FIG. 13, the CPU 2 performs monitoring (polling) of the match signal. In the example shown in FIG. 14, it is configured such that the match signal is received as an interrupt signal. In response to the change of the match signal, the processing for setting the next data is performed as an interrupt processing.

At Step S21, an activation value setting is written. At Step S22, a first target value setting is written. At Step S23, the interrupt processing by the match signal is enabled.

Figure 14B:
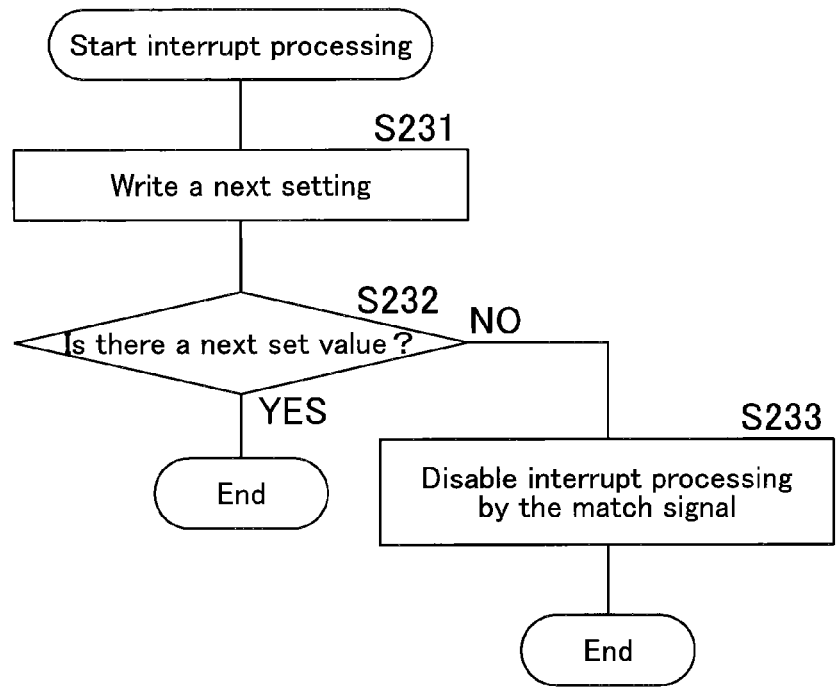

In the interrupt processing shown in FIG. 14(B), after writing a next setting at Step S231, it is discriminated whether there is a next set value at Step S232. If there is (YES at Step S232), the processing terminates. To the contrary, if no next set value exists (NO at Step S232), after disabling the interrupt processing by the match signal at Step S233, the processing terminates.

The employment of such a control method eliminates a poling operation.

Figure 15:
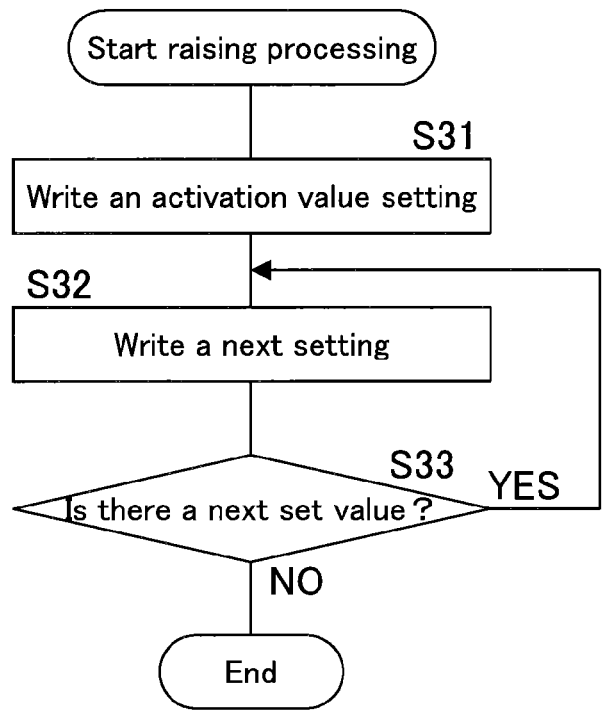
FIG. 15 is a flowchart showing still another example of a control to be performed by a CPU to write in the clock generator module in the case of performing a motor rising control as shown in FIG. 9.

FIG. 15 is a flowchart showing still another example of a control to be performed by the CPU 2 shown in FIG. 1 to write in the clock generation module 1 in the case of performing a raising control of a motor as shown in FIG. 9.

FIG. 3 exemplifies a structure in which the FIFO register 15 is provided in the clock output circuit 12. As mentioned in the explanation of FIG. 3, the role for detecting changes of a match signal and setting next data is performed by the FIFO register 15.

Thus, the CPU 2 is not required to perform the processing of writing data at the timing that a match signal changes, and can simply perform only the administration of the timing for setting a first target value as shown in FIG. 7. That is, the timing for activating a stepping motor is the timing that the output clock is actually outputted. Therefore, this is the only important timing in terms of the control.

At Step S31, an activation value setting is written. After performing a next setting (a first target value setting) at Step S32, the rest of the set data can be continuously set without worrying about timing as shown in this flowchart. That is, it is discriminated whether there is a next set value at Step S33. If there is (YES at Step S33), returning to Step S32, a next setting is written. If there is no next set value (NO at Step S33), the processing terminates.

The set data is accumulated in the FIFO register 15 and automatically set in the continuous variable value generator 13 at appropriate timing. This reduces the control load of the CPU 2. In this case, it is required that the number of stages of the FIFO register 15 shown in FIG. 13 has enough capacity for the amount of data to be continuously written therein.

Figure 16:
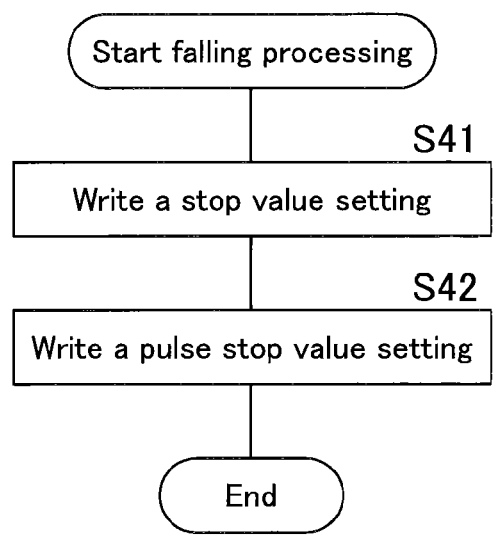
FIG. 16 is a flowchart showing an example of a control to be performed by a CPU to write in the clock generator module in the case of performing a motor falling control as shown in FIG. 10.

FIG. 16 is a flowchart showing an example of a control to be performed by the CPU 2 shown in FIG. 1 to write in the clock generation module 1 in the case of performing a falling control of a motor as shown in FIG. 10.

At Step S41, a stop value setting is written. At Step S42, a pulse stop setting is written.

Figure 17:
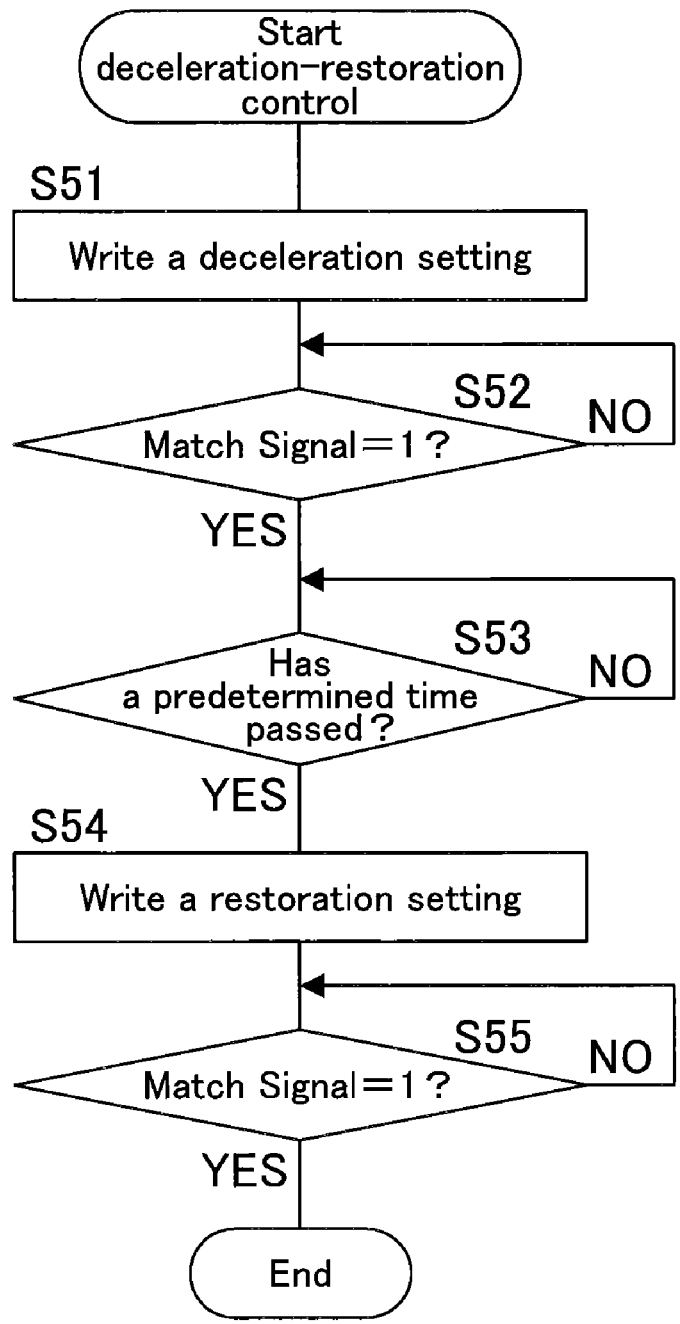
FIG. 17 is a flowchart showing an example of a control to be performed by a CPU to write in the clock generator module in the case of performing the motor deceleration/restoration control as shown in FIG. 11.

FIG. 17 is a flowchart showing an example of a control to be performed by the CPU 2 shown in FIG. 1 to write in the clock generation module 1 in the case of performing a deceleration-restoration control of a motor as shown in FIG. 11.

At Step S51, a deceleration setting is written. At Step S52, it is monitored whether the match signal has become 1. If it has become 1 (YES at Step S52), the routine waits for a predetermined time at Step S53.

After passing a predetermined time (YES at Step S53), at Step S54, a restoration setting is written. Then, at Step S55, it is monitored whether the match signal has become 1. When the match signal has become 1 (YES at S55), the processing terminates.

Figure 18A:
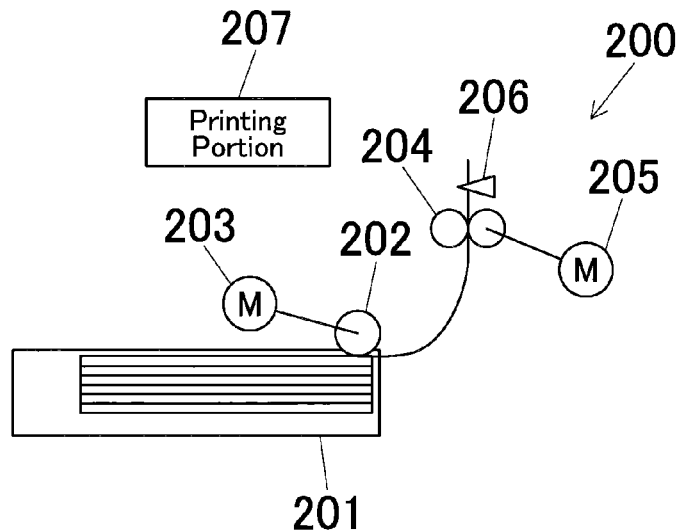
FIG. 18(A) and FIG. 18(B) are explanatory views of a drive control of a paper conveyance motor in an image forming apparatus.
Figure 18B:
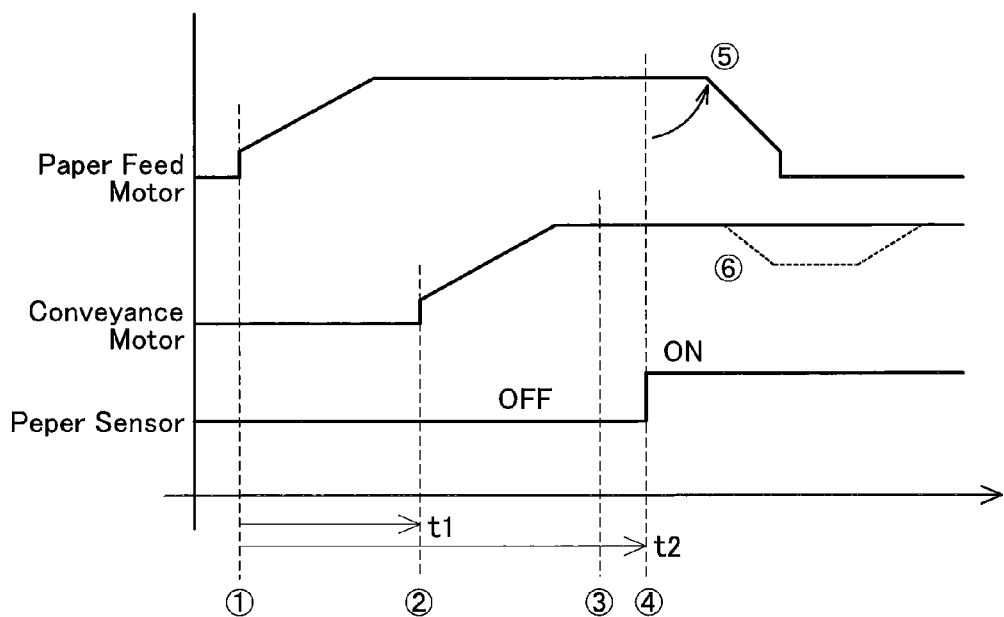

FIGS. 18(A) and 18(B) are explanatory views of a drive control of a motor in an image forming apparatus, wherein FIG. 18(A) is a structural view of the principle portions of the image forming apparatus 200, and FIG. 18(B) is a time chart of respective motors and a sensor under paper feed-conveyance control.

This image forming apparatus 200 is equipped with a paper feed cassette 201 accommodating papers, a paper feed roller 202 for feeding a paper from the paper feed cassette 201, a paper feed motor 203 for driving the paper feed roller 202, conveyance rollers 204 for conveying the fed paper, a conveyance motor 205 for driving the conveyance roller 204, a paper sensor 206 for detecting the passing of a paper, and a printing portion 207 for printing image data on the paper. The paper feed motor 202 and the conveyance motor 205 are driven-controlled by the motor driving apparatus 100 according to the embodiment.

In the image forming apparatus 200 shown in FIG. 18(A), as shown in FIG. 18(B), the paper feed motor 203 is activated (see ①) by the paper feed initiation command. Subsequently, at the timing that the motor reaches the steady rotation before the paper reaches the conveyance rollers 204, the conveyance motor 205 is activated (activated after a predetermined time t1 has passed since the paper feed initiation command) (see ②).

When the paper has reached the conveyance rollers 204 (see ③) and the tip end of the paper has reached the paper sensor 206 and the sensor 206 is turned ON (see ④), the paper is now ready to be conveyed by the conveyance rollers 204. Therefore, the paper feed motor 203 is stopped (see ⑤).

At this time, if a paper sensor arrival time t2 is within the allowable time, that is a predetermined time has not passed yet since the paper feed initiation command was given, and the paper is conveyed while keeping the speed of the conveyance motor 205. To the contrary, if the paper sensor arrival time is shorter than the allowable time as indicated by the dashed line in FIG. 18(B), the deceleration-restoration control of the conveyance motor 205 is performed to delay the paper conveyance (see ⑥).

In this image forming apparatus, a state in which a paper is conveyed at a higher speed than a predetermined one is detected, and the motor is temporarily decelerated from the predetermined speed or accelerated to the predetermined speed (restoration) depending on the detected state. Thus, this image forming apparatus enables a paper conveyance control with a high degree of accuracy.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims an not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A variable frequency clock output circuit, comprising:
   a target value register which stores a target value corresponding to an arbitrarily set target frequency;
   an increase/decrease value register which stores an arbitrarily set increase/decrease value, wherein the increase/decrease value is a fractional value;
   an adder-subtractor which has an input portion into which a current output value is inputted and outputs a calculation result obtained by adding/subtracting the increase/decrease value stored in the increase/decrease value register to/from the current output value inputted into the input portion based on an addition/subtraction instruction signal, wherein the output value of the adder-subtractor includes a fractional value;
   a comparator which compares an output value of the adder-subtractor to the target value stored in the target value register, and outputs an addition/subtraction instruction signal to the adder-subtractor until the output value of the adder-subtractor and the target value coincide, wherein the comparator compares a value of higher-order bits excluding the fractional part of bits from the output value of the adder-subtractor, to the target value, and a value of bits including the fractional part of bits from the current output value of the adder-subtractor, is inputted into the input portion of the adder-subtractor; and
   a clock generator which outputs a clock signal having a frequency proportional to the output value of the adder-subtractor.

2. The variable frequency clock output circuit as recited in claim 1, wherein the adder-subtractor performs a single add-subtract operation every cycle of a source clock.

3. The variable frequency clock output circuit as recited in claim 1, further comprising a selector which selects and outputs either the output of the adder-subtractor or the target value,
   wherein the selector selects the target value when the target value and a value of higher-order bits of the output value of the adder-subtractor coincide with each other, as a result of a comparison thereof by the comparator and when a current value forcible rewrite instruction is received.

4. The variable frequency clock output circuit as recited in claim 1, further comprising a CPU which sets the target value and the increase/decrease value to the target value register and the increase/decrease value register, respectively.

5. A variable frequency clock output circuit, comprising:
   a target value register which stores a target value corresponding to an arbitrarily set target frequency;
   an increase/decrease value register which stores an arbitrarily set increase/decrease value;
   an adder-subtractor which has an input portion into which a current output value is inputted and outputs a calculation result obtained by adding/subtracting the increase/decrease value stored in the increase/decrease value register to/from the current output value inputted into the input portion based on an addition/subtraction instruction signal;
   a comparator which compares an output value of the adder-subtractor to the target value stored in the target value register, and outputs an addition/subtraction instruction signal to the adder-subtractor until the output value of the adder-subtractor and the target value coincide; and a clock generator which outputs a clock signal having a frequency proportional to the output value of the adder-subtractor, wherein the clock generator includes an adder and a selector, wherein the adder adds a value of higher-order bits excluding a fractional part of bits from the output value of the adder-subtractor, to an output value of the selector, wherein the selector selects and outputs either the output value of the adder or fixed data, and wherein the clock generator outputs a value of highest-order bits of the output value of the selector as a clock signal.

6. The variable frequency clock output circuit as recited in claim 5, wherein only the highest-order bit of the fixed data is 0, or all of the bits of the fixed data are 1.

7. The variable frequency clock output circuit as recited in claim 5, wherein the selector selects either the output value of the adder or the fixed data, based on the output of the clock generator and a clock output ON/OFF signal for outputting or stopping a clock from the clock generator.

8. The variable frequency clock output circuit as recited in claim 5, wherein the adder performs a single add operation during one cycle of a source clock.

9. A variable frequency clock output circuit, comprising:
a target value register which stores a target value corresponding to an arbitrarily set target frequency;
an increase/decrease value register which stores an arbitrarily set increase/decrease value;
an adder-subtractor which has an input portion into which a current output value is inputted and outputs a calculation result obtained by adding/subtracting the increase/decrease value stored in the increase/decrease value register to/from the current output value inputted into the input portion based on an addition/subtraction instruction signal;
a comparator which compares an output value of the adder-subtractor to the target value stored in the target value register, and outputs an addition/subtraction instruction signal to the adder-subtractor until the output value of the adder-subtractor and the target value coincide;
a clock generator which outputs a clock signal having a frequency proportional to the output value of the adder-subtractor; and
a multi-stage FIFO register for the target value register and the increase/decrease value register,
wherein a target value and an increase/decrease value are set to the target value register and the increase/decrease value register, respectively from the FIFO register, every time the output value of the adder-subtractor and the target value coincide with each other as a result of the comparison by the comparator.

10. A variable frequency clock output apparatus in which a plurality of variable frequency clock output circuits are integrally modularized,
wherein each of the variable frequency clock output circuits comprises:
a target value register which stores a target value corresponding to an arbitrarily set target frequency;
an increase/decrease value register which stores an arbitrarily set increase/decrease value, wherein the increase/decrease value is a fractional value;
an adder-subtractor which has an input portion into which a current output value is inputted and outputs a calculation result obtained by adding/subtracting the increase/decrease value stored in the increase/decrease value register to/from the current output value inputted into the input portion based on an addition/subtraction instruction signal, wherein the output value of the adder-subtractor includes a fractional value;
a comparator which compares an output value of the adder-subtractor to the target value stored in the target value register, and outputs an addition/subtraction instruction signal to the adder-subtractor until the output value of the adder-subtractor and the target value coincide, wherein the comparator compares a value of higher-order bits excluding the fractional part of bits from the output value of the adder-subtractor, to the target value, and a value of bits including the fractional part of bits from the current output value of the adder-subtractor, is inputted into the input portion of the adder-subtractor; and
a clock generator which outputs a clock signal having a frequency proportional to the output value of the adder-subtractor.

11. The variable frequency clock output apparatus as recited in claim 10, further comprising a CPU which sets the target value and the increase/decrease value to the target value registers and the increase/decrease value registers in the arbitrarily given plurality of variable frequency clock output circuits, respectively.

12. An image forming apparatus, comprising:
one or a plurality of paper conveyance motors;
a motor driving apparatus which drives the paper conveyance motors; and
a printer which prints on a paper conveyed by the paper conveyance motors,
wherein the motor driving apparatus is equipped with a variable frequency clock output circuit and a driving circuit which drives a motor based on a clock outputted from the clock output circuit, and
wherein the variable frequency clock output circuit comprises:
a target value register which stores a target value corresponding to an arbitrarily set target frequency;
an increase/decrease value register which stores an arbitrarily set increase/decrease value, wherein the increase/decrease value is a fractional value;
an adder-subtractor which has an input portion into which a current output value is inputted and outputs a calculation result obtained by adding/subtracting the increase/decrease value stored in the increase/decrease value register to/from the current output value inputted into the input portion based on an addition/subtraction instruction signal, wherein the output value of the adder-subtractor includes a fractional value;
a comparator which compares an output value of the adder-subtractor to the target value stored in the target value register, and outputs an addition/subtraction instruction signal to the adder-subtractor until the output value of the adder-subtractor and the target value coincide, wherein the comparator compares a value of higher-order bits excluding the fractional part of bits from the output value of the adder-subtractor, to the target value, and a value of bits including the fractional part of bits from the current output value of the adder-subtractor, is inputted into the input portion of the adder-subtractor; and
a clock generator which outputs a clock signal having a frequency proportional to the output value of the adder-subtractor.

13. An image forming apparatus, comprising:
one or a plurality of paper conveyance motors;
a motor driving apparatus which drives the paper conveyance motors; and
a printer which prints on a paper conveyed by the paper conveyance motors, wherein the motor driving apparatus is equipped with a variable frequency clock output circuit and a driving circuit which drives a motor based on a clock outputted from the clock output circuit, and
wherein the variable frequency clock output circuit comprises:
a target value register which stores a target value corresponding to an arbitrarily set target frequency;
an increase/decrease value register which stores an arbitrarily set increase/decrease value;
an adder-subtractor which has an input portion into which a current output value is inputted and outputs a calculation result obtained by adding/subtracting the increase/decrease value stored in the increase/decrease value register to/from the current output value inputted into the input portion based on an addition/subtraction instruction signal;
a comparator which compares an output value of the adder-subtractor to the target value stored in the target value register, and outputs an addition/subtraction instruction signal to the adder-subtractor until the output value of the adder-subtractor and the target value coincide; and
a clock generator which outputs a clock signal having a frequency proportional to the output value of the adder-subtractor,
wherein a CPU sets the target value and the increase/decrease value that are appropriate for a paper conveyance sequence, onto the target registers and the increase/decrease registers in one or a plurality of variable frequency clock output circuits, respectively;
a detector which detects a paper conveyance status,
wherein the CPU sets the target value and the increase/decrease value that are appropriate for the detected paper conveyance status.

14. The image forming apparatus as recited in claim 13, wherein the detector detects a status in which a paper conveyance goes on at a higher speed than a predetermined one, and every time it detects such a status, the CPU sets the target value and the increase/decrease value that are appropriate for the detected status, in order to decelerate from or accelerate to the predetermined speed temporarily.

15. A variable frequency clock output apparatus in which a plurality of variable frequency clock output circuits are integrally modularized,
wherein each of the variable frequency clock output circuits comprises:
a target value register which stores a target value corresponding to an arbitrarily set target frequency;
an increase/decrease value register which stores an arbitrarily set increase/decrease value;
an adder-subtractor which has an input portion into which a current output value is inputted and outputs a calculation result obtained by adding/subtracting the increase/decrease value stored in the increase/decrease value register to/from the current output value inputted into the input portion based on an addition/subtraction instruction signal;
a comparator which compares an output value of the adder-subtractor to the target value stored in the target value register, and outputs an addition/subtraction instruction signal to the adder-subtractor until the output value of the adder-subtractor and the target value coincide; and
a clock generator which outputs a clock signal having a frequency proportional to the output value of the adder-subtractor, wherein the clock generator includes an adder and a selector, the adder adds a value of higher-order bits excluding a fractional part of bits from the output value of the adder-subtractor, to an output value of the selector, the selector selects and outputs either the output value of the adder or fixed data, and the clock generator outputs a value of highest-order bits of the output value of the selector as a clock signal.

16. A variable frequency clock output apparatus in which a plurality of variable frequency clock output circuits are integrally modularized,
wherein each of the variable frequency clock output circuits comprises:
a target value register which stores a target value corresponding to an arbitrarily set target frequency;
an increase/decrease value register which stores an arbitrarily set increase/decrease value;
a multi-stage FIFO register for the target value register and the increase/decrease value register,
an adder-subtractor which has an input portion into which a current output value is inputted and outputs a calculation result obtained by adding/subtracting the increase/decrease value stored in the increase/decrease value register to/from the current output value inputted into the input portion based on an addition/subtraction instruction signal;
a comparator which compares an out/Put value of the adder-subtractor to the target value stored in the target value register, and outputs an addition/subtraction instruction signal to the adder-subtractor until the output value of the adder-subtractor and the target value coincide; and
a clock generator which outputs a clock signal having a frequency proportional to the output value of the adder-subtractor,
wherein a target value and an increase/decrease value are set to the target value register and the increase/decrease value register, respectively from the FIFO register, every time the output value of the adder-subtractor and the target value coincide with each other as a result of the comparison by the comparator.

17. An image forming apparatus, comprising:
one or a plurality of paper conveyance motors;
a motor driving apparatus which drives the paper conveyance motors; and
a printer which prints on a paper conveyed by the paper conveyance motors,
wherein the motor driving apparatus is equipped with a variable frequency clock output circuit and a driving circuit which drives a motor based on a clock outputted from the clock output circuit, and
wherein the variable frequency clock output circuit comprises:
a target value register which stores a target value corresponding to an arbitrarily set target frequency;
an increase/decrease value register which stores an arbitrarily set increase/decrease value;
an adder-subtractor which has an input portion into which a current output value is inputted and outputs a calculation result obtained by adding/subtracting the increase/decrease value stored in the increase/decrease value register to/from the current output value inputted into the input portion based on an addition/subtraction instruction signal;

a comparator which compares an output value of the adder-subtractor to the target value stored in the target value register, and outputs an addition/subtraction instruction signal to the adder-subtractor until the output value of the adder-subtractor and the target value coincide; and a clock generator which outputs a clock signal having a frequency proportional to the output value of the adder-subtractor, wherein the clock generator includes an adder and a selector, the adder adds a value of higher-order bits excluding a fractional part of bits from the output value of the adder-subtractor, to an output value of the selector, the selector selects and outputs either the output value of the adder or fixed data, and the clock generator outputs a value of highest-order bits of the output value of the selector as a clock signal.

18. An image forming apparatus, comprising:

one or a plurality of paper conveyance motors;

a motor driving apparatus which drives the paper conveyance motors; and a printer which prints on a paper conveyed by the paper conveyance motors, wherein the motor driving apparatus is equipped with a variable frequency clock output circuit and a driving circuit which drives a motor based on a clock outputted from the clock output circuit, and wherein the variable frequency clock output circuit comprises:

a target value register which stores a target value corresponding to an arbitrarily set target frequency;

an increase/decrease value register which stores an arbitrarily set increase/decrease value;

a multi-stage FIFO register for the target value register and the increase/decrease value register, an adder-subtractor which has an input portion into which a current output value is inputted and outputs a calculation result obtained by adding/subtracting the increase/decrease value stored in the increase/decrease value register to/from the current output value inputted into the input portion based on an addition/subtraction instruction signal;

a comparator which compares an output value of the adder-subtractor to the target value stored in the target value register, and outputs an addition/subtraction instruction signal to the adder-subtractor until the output value of the adder-subtractor and the target value coincide; and a clock generator which outputs a clock signal having a frequency proportional to the output value of the adder-subtractor, wherein a target value and an increase/decrease value are set to the target value register and the increase/decrease value register, respectively from the FIFO register, every time the output value of the adder-subtractor and the target value coincide with each other as a result of the comparison by the comparator.

* * * * *